United States Patent
Nimmagadda et al.

(10) Patent No.: US 10,108,371 B2
(45) Date of Patent: Oct. 23, 2018

(54) METHOD AND SYSTEM FOR MANAGING HOST MEMORY BUFFER OF HOST USING NON-VOLATILE MEMORY EXPRESS (NVME) CONTROLLER IN SOLID STATE STORAGE DEVICE

(71) Applicant: Samsung Electronics Co., Ltd., Suwon-si, Gyeonggi-do (KR)

(72) Inventors: Venkataratnam Nimmagadda, Bangalore (IN); Vulligadla Amaresh, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/489,853

(22) Filed: Apr. 18, 2017

(65) Prior Publication Data
US 2018/0136875 A1 May 17, 2018

(30) Foreign Application Priority Data
Nov. 15, 2016 (IN) .............................. 201641038916

(51) Int. Cl.
G06F 12/00 (2006.01)
G06F 3/06 (2006.01)
G06F 13/16 (2006.01)

(52) U.S. Cl.
CPC ............ *G06F 3/0656* (2013.01); *G06F 3/061* (2013.01); *G06F 3/0644* (2013.01); *G06F 3/0659* (2013.01); *G06F 3/0679* (2013.01); *G06F 13/1673* (2013.01)

(58) Field of Classification Search
CPC ...... G06F 3/0656; G06F 3/061; G06F 3/0644; G06F 3/0659; G06F 3/0679; G06F 13/1673
See application file for complete search history.

(56) References Cited

U.S. PATENT DOCUMENTS 7,496,699 B2  2/2009 Pope et al.

*Primary Examiner* — Midys Rojas
(74) *Attorney, Agent, or Firm* — Harness, Dickey & Pierce, P.L.C.

(57) ABSTRACT

A solid state storage device including a non-volatile memory Express (NVMe) controller and configured to manage a Host Memory Buffer (HMB) in a host may be provided. The NVMe controller may be configured to fetch HMB descriptor entries as part of a feature command from the host, partition the HMB logically into a control buffer partition and a data buffer partition, store the HMB descriptor entries pointing to the control buffer partition within the solid state storage device as an HMB pointer list table, and write-back the HMB descriptor entries pointing to the data buffer partition into the control buffer partition of HMB.

12 Claims, 8 Drawing Sheets

US 10,108,371 B2

METHOD AND SYSTEM FOR MANAGING HOST MEMORY BUFFER OF HOST USING NON-VOLATILE MEMORY EXPRESS (NVME) CONTROLLER IN SOLID STATE STORAGE DEVICE

CROSS-REFERENCE TO RELATED APPLICATION

This application claims priority under 35 U.S.C. 119 to Indian Patent Application No. 201641038916 filed on Nov. 15, 2016 in the Indian Intellectual Property Office, the entire contents of which are incorporated herein by reference.

BACKGROUND

1. Field

The present inventive concepts relate to host memory buffer (HMB) management, and more particularly relates to methods and/or systems for managing HMB in a host by Non-Volatile Memory Express (NVMe) Solid State Drive (SSD).

2. Description of the Related Art

Flash memories are rapidly maturing into a promising technology of storage system. Flash memories have various advantages, which include but are not limited to low access latency, low power consumption, higher resistance to shocks, and/or light weight. Thus, flash memories have been receiving great interest from both the academia and commercial sectors. Flash memories are traditionally used in portable devices, but due to the aforesaid advantages, they are now being employed in other types of electronic devices (e.g., personal computer, Television, mobile phone, and/or server storage space) in the form of Solid State Drives (SSDs).

A Host Memory Buffer (HMB) is the feature newly introduced in the NVMe) Spec 1.2 version. The HMB feature provides a mechanism for a host to allocate a portion of host memory exclusively for the SSD. The SSD may use such allocated host memory for various purposes, which include but are not limited to storing metadata, buffering cache, managing the NVMe non-contiguous queue's address management.

SSDs can utilize the HMB in the host when the host sends the feature command with Host Memory buffer as feature ID. After a successful completion of a feature command that enables the HMB, the host may not write, for example, a buffer size or a descriptor list to the associated host memory region until the HMB is disabled. After a successful completion of a feature command that disables the HMB, the SSDs may not access any data of the HMB buffer (e.g., dynamic random access memory (DRAM)) until the HMB has been enabled.

FIG. 1A illustrates example system in which a solid state storage device 200 communicates with a host 100 to access an HMB 102 of the host 100.

Referring to the FIG. 1A, the solid state storage device 200 is connected to the host 100 through a host interface 202. At step-1, an NVMe controller 204 fetches HMB descriptor entries to execute the feature command issued by the host 100. The HMB descriptor entries may include, for example, a buffer address and size of the HMB. Once the NVMe controller 204 has fetched the HMB descriptor entries from the host 100, then at step-2, the NVMe controller 204 may store these HMB descriptor entries into a Device Buffer 210 of the solid state storage device 200 for future data transfer towards the HMB 102 of the host 100.

For example, to support 1 GB data that is scattered at host DRAM of the HMB 102, the solid state storage device 200 may need 2 MB of internal memory (e.g., Device Buffer 210), which is relatively large, as will be detailed in FIG. 2.

FIG. 1B illustrates the example system of FIG. 1A to depict operations associated with data transfer between the HMB 102 and the Solid state storage device 200.

Referring to the FIG. 1B, initially, at step-1, the HMB-DMA controller 208 may communicate with the Device Buffer 210 to fetch desired HMB descriptor entries. At step-2, the HMB-DMA controller 208 may communicate with the Device Buffer 210 to fetch desired data cached in the Device Buffer 210. At step-3, the HMB-DMA controller 208 may transfer the data to the host 100 at the address included in the HMB descriptor, which has been determined at the step-1.

FIG. 2 illustrates an example, in which 1 GB of the HMB 102 is partitioned into a plurality of memory pages (each of which has a size of 4 KB). If 1 GB of HMB 102 is to be distributed/scattered across the multiple memory pages, then the solid state storage device 200 may need to store 256K of addresses (each address of 8 byte) into the device buffer 210. This will demand 2 MB (256K*8 Byte) of memory in the device buffer 210 for storing the HMB descriptor entries.

Thus, increasing the internal buffer inevitably results in increase cost and/or power consumption of the solid state storage device 200.

SUMMARY

Some example embodiments provide methods, and/or systems for managing a Host Memory Buffer (HMB) of a host, which demands less buffer memory inside the solid state storage device.

Some example embodiments may provide methods for fetching, by non-volatile memory express (NVMe) controller, HMB descriptor entries as part of a feature command from the host. Some example embodiments herein may provide methods for logically partitioning the HMB of the host in to a control buffer partition and data buffer partition by solid state storage device.

Some example embodiments provide methods for storing, by the NVMe controller, the HMB descriptors pointing to the control buffer partition of an HMB within the solid state storage device as a HMB pointer list table.

Some example embodiments provide methods for writing-back, by solid state storage device, the HMB descriptor entries pointing to the data buffer partition of an HMB into a control buffer partition of the HMB.

Some example embodiments provide methods for finding the address of the data buffer partition of an HMB for a data transfer, by solid state storage device, by referring to HMB pointer list table and fetching the corresponding HMB descriptor entry from a control buffer partition of the HMB.

According to an example embodiment, a solid state storage device may be configured to manage an HMB of a host. The solid state storage device may include a non-volatile memory express (NVMe) controller, which is configured to fetch HMB descriptor entries as part of a feature command from the host, partition the HMB logically into a control buffer partition and a data buffer partition, store the HMB descriptor entries pointing to the control buffer partition within the solid state storage device as an HMB pointer list table, and write-back the HMB descriptor entries pointing to the data buffer partition of HMB into the control buffer partition of HMB.

According to an example embodiment, a system may include a host and a solid state storage device. The hose may include an HMB, and a host driver configured to provide HMB descriptor entries as part of a feature command to a solid state storage device. The solid state storage device may include a NVMe controller, which is configured to fetch the HMB descriptor entries as part of a feature command from the host, partition the HMB logically into a control buffer partition and a data buffer partition, store the HMB descriptor entries pointing to the control buffer partition within the solid state storage device as an HMB pointer list table, and write the HMB descriptor entries pointing to the data buffer partition of HMB into the control buffer partition of HMB, and transfer the data between the data buffer partition of the HMB and the solid state storage device.

According to an example embodiments, a method for managing an HMB of a host by a solid state storage device may include fetching, by the solid state storage device, HMB descriptor entries as part of a feature command from the host, partitioning, by the solid state storage device, the HMB logically into a control buffer partition and a data buffer partition, storing, by the solid state storage device, the HMB descriptor entries pointing to the control buffer partition within the solid state storage device as an HMB pointer list table and writing-back, by the solid state storage device, the HMB descriptor entries pointing the data buffer partition of HMB into the control buffer partition of HMB. The control buffer partition may be referred to by entries of HMB pointer list table.

These and other aspects of the example embodiments disclosed herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of example embodiments herein without departing from the spirit thereof.

BRIEF DESCRIPTION OF THE DRAWINGS

Some example embodiments are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
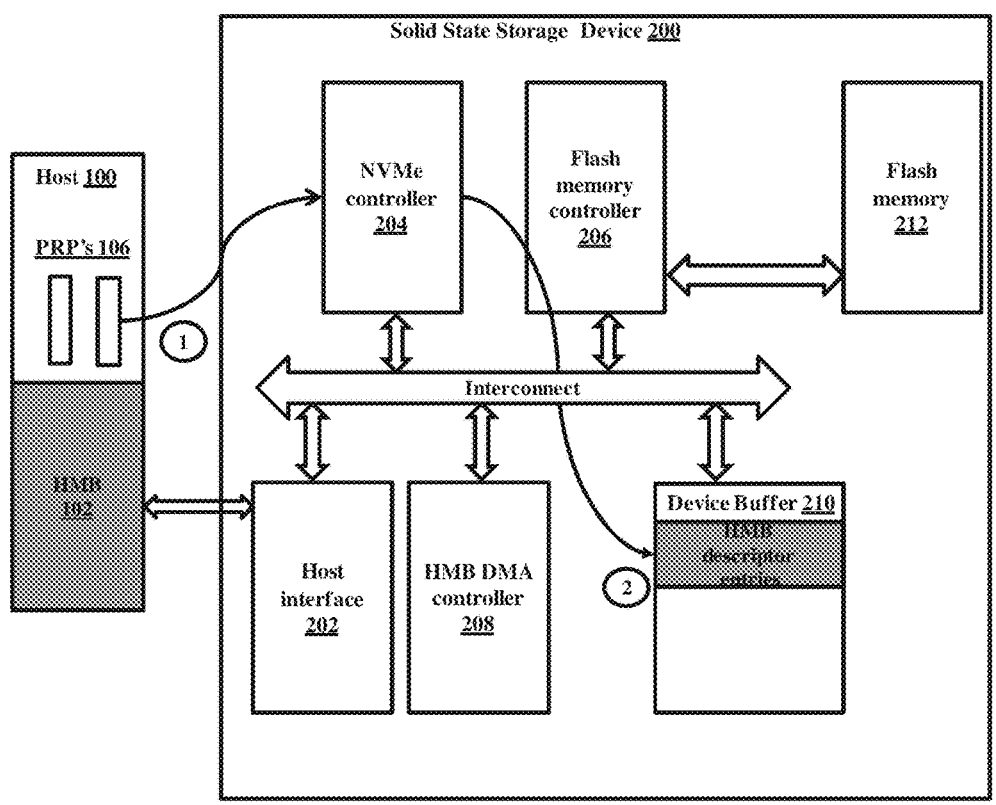
FIG. 1A illustrates an example system in which a solid state storage device manages a Host Memory Buffer (HMB) of a host, according to related art.

Various example embodiments of the present disclosure will now be described in detail with reference to the accompanying drawings. In the following description, specific details such as detailed configuration and components are merely provided to assist the overall understanding of these example embodiments of the present disclosure. Therefore, it should be apparent to those skilled in the art that various changes and modifications of the example embodiments described herein can be made without departing from the scope and spirit of the present disclosure. In addition, descriptions of well-known functions and constructions are omitted for clarity and conciseness.

Also, the various example embodiments described herein are not necessarily mutually exclusive, as some example embodiments can be combined with one or more other example embodiments to form new example embodiments.

Herein, the term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the disclosed example embodiments should not be construed as limiting the scope of example embodiments of the present disclosure.

The example embodiments disclosed herein may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure. Likewise, the blocks of the example embodiments may be physically combined into more complex blocks without departing from the scope of the disclosure.

Some example embodiments disclosed herein provide a mechanism by which a solid state storage device manages a Host Memory Buffer (HMB) of a host. The solid state storage device includes a non-volatile memory express (NVMe) controller configured to fetch HMB descriptor entries as a part of a set feature command from the host, partition the HMB logically into a control buffer partition and data buffer partition, store the HMB descriptors pointing to control buffer partition within the solid state storage device as an HMB pointer list table, and write-back the HMB descriptor entries pointing the data buffer partition of the HMB into control buffer partition of the HMB.

Some example embodiments disclosed herein provide methods for managing an HMB of a host by a solid state storage device. The methods include fetching HMB descriptor entries as part of a feature command from the host, partitioning the HMB logically into a control buffer partition and data buffer partition, storing the HMB descriptors pointing to control buffer partition within the solid state storage device as an HMB pointer list table, and writing-back the HMB descriptor entries pointing the data buffer partition of HMB into control buffer partition of HMB.

Unlike the conventional methods and/or systems of the related art, the proposed methods and/or systems may not store all the HMB descriptor entries into the solid state storage device's memory, thereby reducing the cost and power consumption of the solid state storage device. For example, to manage 1 GB data of HMB that is scattered, 2 MB of storage space may be occupied at a host DRAM to store the HMB descriptor entries. However, the proposed mechanism in solid state storage device may occupy only 4 KB of space in solid state storage device to store the HMB pointer list table.

Unlike the conventional methods of the related art, the proposed method utilizes the HMB area of the host itself for storing the HMB descriptor entries.

Referring now to the drawings, and more particularly to FIGS. 3A through 6, where same or similar reference characters denote corresponding same or similar features consistently throughout the figures.

Figure 3A:
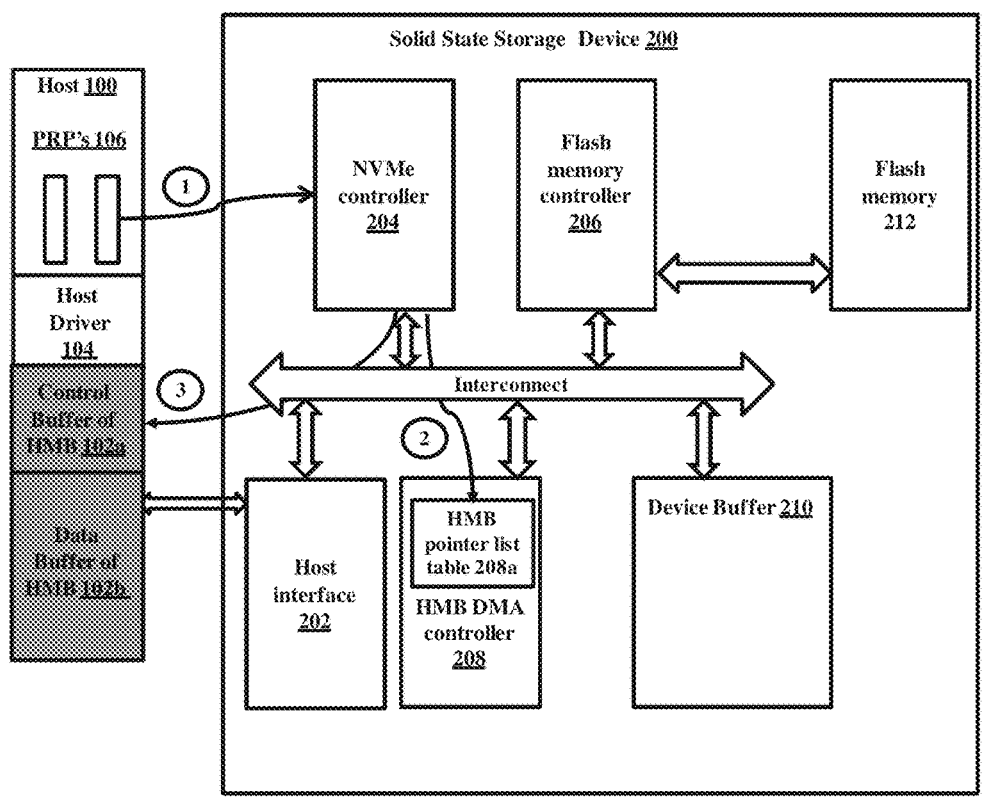
FIG. 3A illustrates an example system in which the solid state storage device manages the HMB of a host, according to an example embodiment as disclosed herein.

FIG. 3A illustrates an example system in which a solid state storage device 200 manages an HMB 102 of a host 100, according to an example embodiment as disclosed herein.

Unlike the conventional method discussed in the BACKGROUND section with reference to FIG. 1A, the proposed system illustrated in FIG. 3A allows the solid state storage device 200 to manage the HMB 102 of the host 100.

Referring to the FIG. 3A, the system may include the host 100 and the solid state storage device 200.

The host 100 may be, for example, electronic device, a laptop computer, a desktop computer, a smart television, a smart display, a notebook computer, a notebook, a tablet, a mobile phone, internet of things (IoT), electronic chipsets, electronic circuits, processor, or other forms of data processing device that are within the scope of the example embodiments discussed herein. Further, the host 100 may include an HMB 102 that is logically partitioned into, for example, a control buffer partition 102a and a data buffer partition 102b, host driver 104, and a one or more physical region pages (PRPs) 106 configured to transfer the HMB descriptor entries using the feature command. The feature command may include an HMB-ID by way of which the host 100 can provide the HMB descriptor entries, which point towards locations of the HMB 102 in the host 100 (e.g., DRAM).

The host driver 104 may provide the HMB descriptor entries as a part of a feature command as per NVMe Specification to the solid state storage device 200.

For example, the solid state storage device 200 may include a host interface 202, which enables the host 100 to gain access to the solid state storage device 200. The host interface 202 may be implemented using any existing host interfacing standards (e.g. Peripheral Component Interconnect Express (PCIe)) known to a skilled person in the art.

Further, the solid state storage device 200 may include NVMe controller 204, which is configured to fetch the HMB descriptor entries as part of a feature command from the host 100. Further, the NVMe controller 204 may be configured to partition the HMB 102 in host 100 as control buffer partition 102a and data buffer partition 102b. Further, the NVMe controller 204 may be configured to store the HMB descriptors pointing to control buffer partition within the solid state storage device 200 as an HMB pointer list table 208a. Furthermore, the NVMe controller 204 may be configured to write-back the HMB descriptor entries of data buffer partition 102b to the control buffer partition 102a of the HMB 102 of the host 100, and access the data to the data buffer partition 102b of the HMB 102 of the host 100.

Further, the solid state storage device 200 may include the flash memory controller 206 coupled to a flash memory 212 (or other non-volatile memories such as Spin-Torque Transfer Magnetic RAM (STT-MRAM)), and a Device Buffer 210.

The flash memory 212 may include, for example, a plurality of NAND flash memory modules.

Figure 3B:
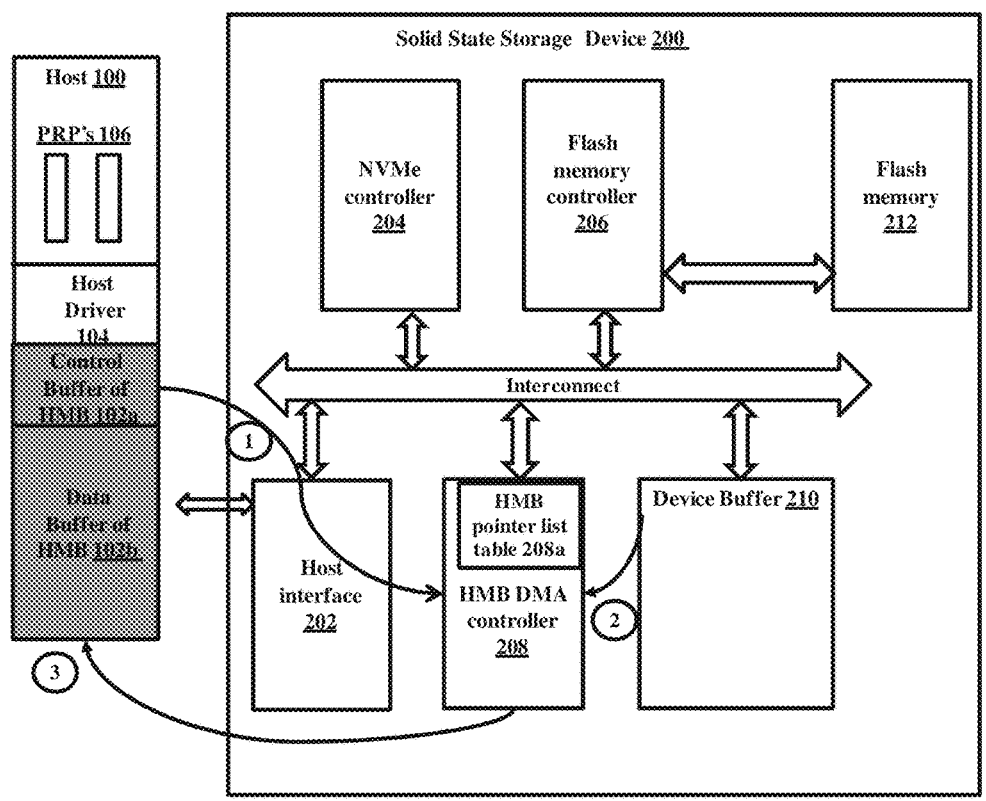
FIG. 3B illustrates the example system of FIG. 3A to depict operations associated with data access between the HMB and the solid state storage device, according to an example embodiment as disclosed herein.

FIG. 3B illustrates the example system of FIG. 3A to depict operations associated with data access between an HMB and a Solid state storage device according to an example embodiment as disclosed herein.

Figure 1B:
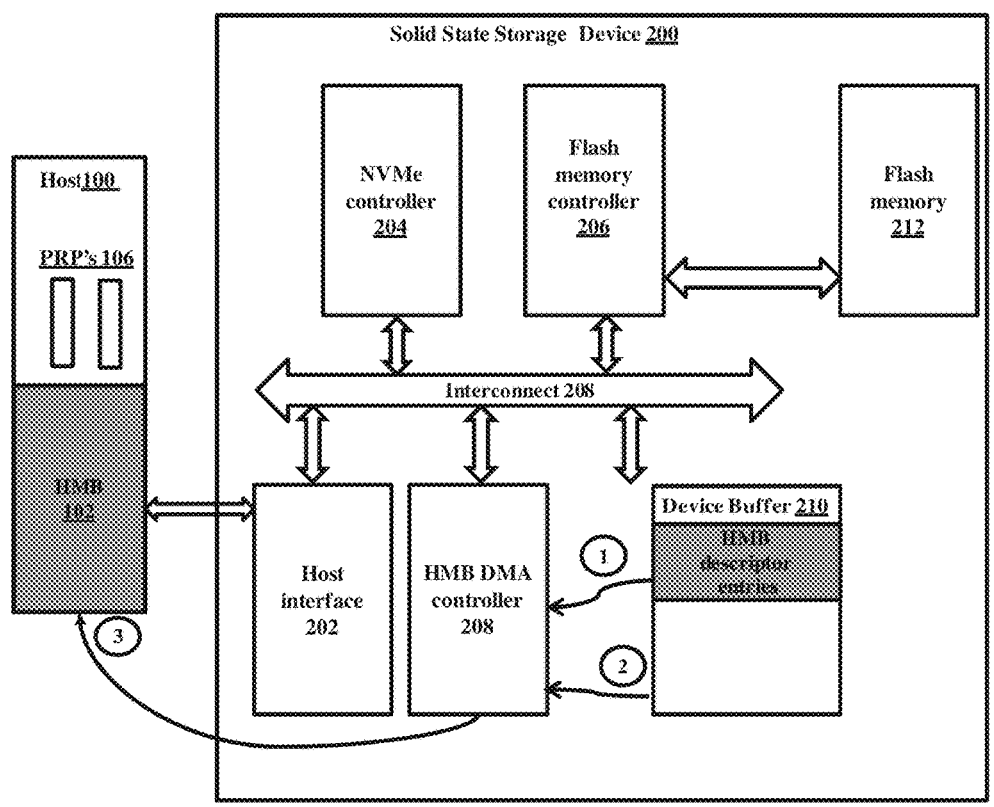
FIG. 1B illustrates the example system of FIG. 1A to depict the operations associated with data access between the HMB and the solid state storage device, according to related art.

Unlike the conventional methods discussed in the BACKGROUND section with reference to FIG. 1B, the proposed system illustrated in FIG. 3B greatly reduces the buffer requirements in the solid state storage device 200.

Referring to FIG. 3B, at step-1, the HMB-DMA controller 208 may be configured to identify the entry in HMB pointer list table, fetch the HMB descriptor entries from the control buffer partition 102a of the HMB 102, and identify the address of data buffer partition of HMB to which the data transfer is intended. Further, at step-2, the HMB-DMA controller 208 may be configured to fetch the data to be transferred from device buffer 210. Furthermore, at step-3, the HMB-DMA controller 208 may be configured to transfer the data fetched to the data buffer partition 102b of the HMB 102. Further, the HMB-DMA controller 208 may be configured to fetch data from data buffer portion 102 and transfer it to device buffer 210.

FIGS. 3A and 3B show some example embodiments of the proposed system. However, example embodiments are not limited thereto. Further, the system can include any number of units along with other hardware or software components communicating with each other. For example, the component can be, but not limited to, a process running in the controller or processor, an object, an executable process, a thread of execution, a program, or a computer. By way of illustration, both an application running on a device and the device itself can be referred to as individual components.

Figure 4:
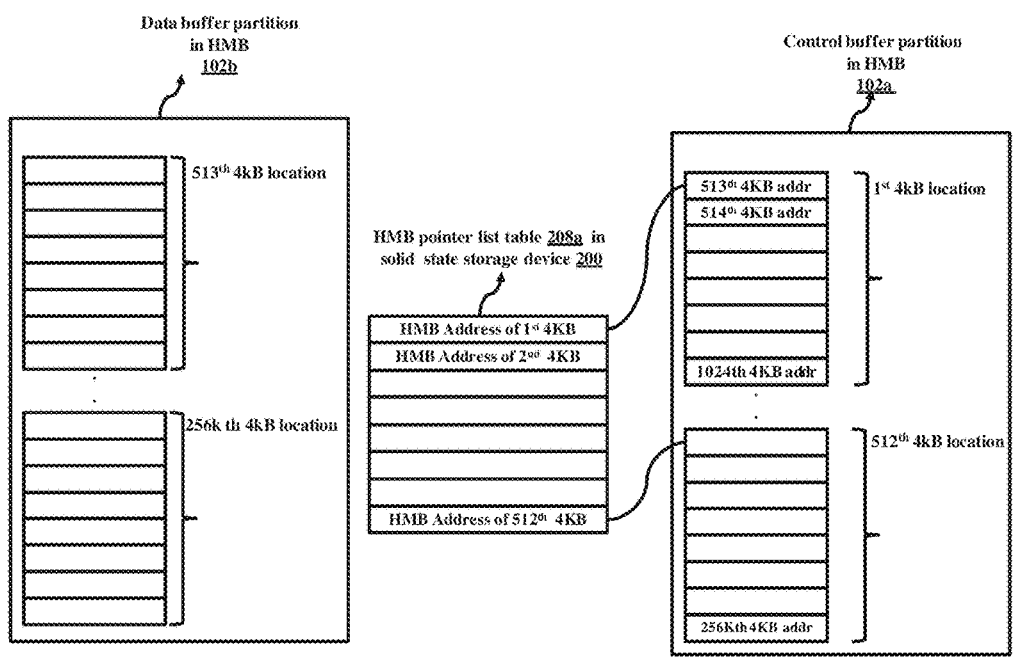
FIG. 4 illustrates an example in which the HMB of a host is organized by maintaining the HMB pointer list table in the solid state storage device, according to an example embodiment as disclosed herein.

FIG. 4 illustrates an example in which the HMB 102 of the host 100 is organized by maintaining the HMB pointer list table in a solid storage device by partitioning the HMB into control buffer partition and data buffer partition, according to an example embodiment as disclosed herein.

Figure 2:
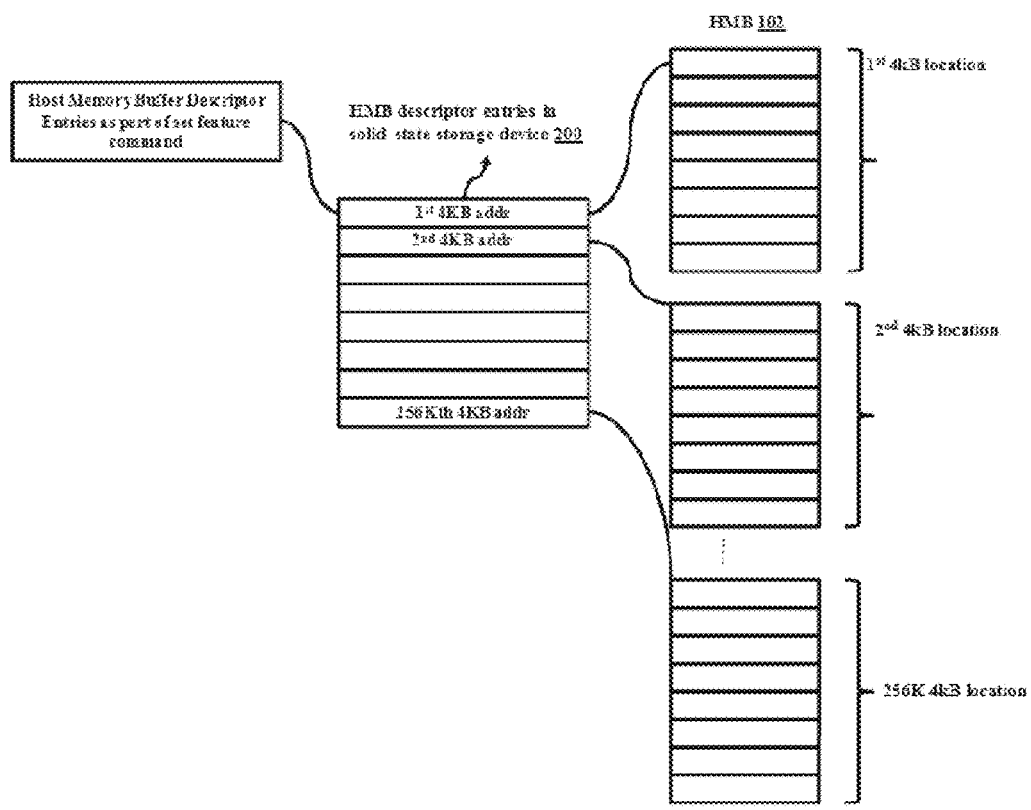
FIG. 2 illustrates an example in which the HMB of the host is managed by storing the HMB descriptor entries in a device buffer, according to related art.

Unlike the conventional method discussed in the BACKGROUND section with reference to FIG. 2, the proposed system illustrated in FIG. 4 allows the solid state storage device 200 to access HMB with reduced buffer requirements.

Referring to FIG. 4, the HMB 102 may be partitioned into the control buffer partition 102a and the data buffer partition 102b. The control buffer partition 102a may include 4 KB split version of HMB descriptor entries of data buffer partition of the HMB. For example, the first 4 KB page of the control buffer partition 102a may include from $513^{th}$ 4 KB location's address of HMB (which is the 1st HMB descriptor entry of the data buffer partition 102b) to $1024^{th}$ 4 KB location's address of HMB (which is the $512^{th}$ HMB descriptor entry of the data buffer partition 102b). The second 4 KB page of the control buffer partition 102a may include from $1025^{th}$ 4 KB location's address of HMB (which is $513^{th}$ 4 KB HMB descriptor of data buffer partition) to $1536^{th}$ 4 KB address of HMB (which is $1024^{th}$ HMB descriptor of data buffer partition). The $512^{th}$ 4 KB page of control buffer partition may include the last set of HMB descriptor entries of the data buffer partition 102b. Each 4 KB page address of the control buffer partition 102a makes one entry to the HMB pointer list table 208a that is stored in the solid state storage device 200.

The data buffer partition 102b may be configured to store actual data.

For example, to allocate 1 GB HMB in the host 100, 256K pages (each has a page size of 4 KB) may be desired. According to this example embodiment, the solid state storage device 200 may store the HMB descriptor entries in the allocated HMB 102. The solid state storage device 200 may maintain the HMB pointer list table 208a, as shown in FIG. 4, which stores the addresses of the split HMB descriptor entries corresponding to the control buffer partition of HMB 102a. As illustrated in FIG. 4, the HMB pointer list table 208a may maintain 512 addresses, which refer to corresponding 4 KB pages of the control buffer partition of HMB 102a. Thus, the total size of an internal buffer of the solid state storage device 200 that is desired to store the HMB pointer list table 208a may be only 4 KB (corresponding to 512*64 bits, where 64-bit is the address width to represent host addresses) to handle addresses of 1 GB allocated HMB 102.

Unlike to the conventional methods, in the proposed method, buffer in the solid state storage device 200 may be saved without compromising performance, power consumption of the solid state storage device 200 may be reduced, and a manufacturing cost of the solid state storage device 200 may be lowered as die size is reduced. The proposed methods and/or systems may be effective in a case where substantially scattered HMB descriptors are allocated by the host 100 for the HMB 102, and may eliminate dependency/assumption of the host 100 behavior in allocating the HMB descriptors for the HMB 102. Further, additional PCIe read latency involved to receive the data buffer partition's HMB descriptor information from the control buffer partition 102a of the HMB 102 may be hidden in pipeline.

Figure 5:
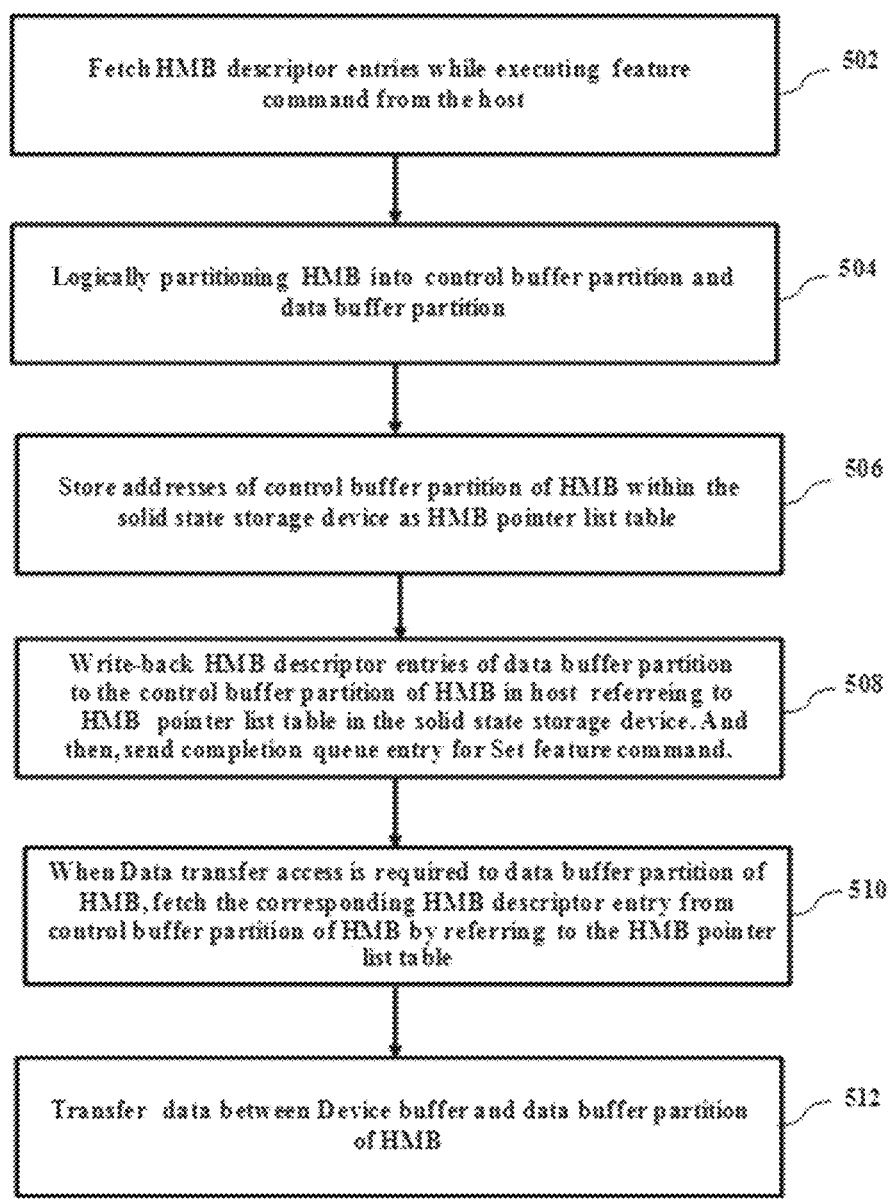
FIG. 5 is a flowchart illustrating various operations for managing the HMB of a host, according to an example embodiment as disclosed herein.

FIG. 5 is a flowchart illustrating various operations for managing the HMB 102 of the host 100, according to an example embodiment as disclosed herein.

Referring to FIG. 5, at step 502, the solid state storage device 200 fetches the HMB descriptor entries as part of the feature command from the host 100. For example, in the solid state storage device 200, as illustrated in FIG. 3A, the NVMe controller 204 may fetch the HMB descriptor entries as part of the feature command from the host 100.

Further, at step 504, the solid state storage device 200 partitions the HMB 102 as the control buffer partition 102a and the data buffer partition 102b.

Further, at step 506, the solid state storage device 200 stores the addresses of HMB (addresses of the control buffer partition 102a of the HMB 102). For example, in the solid state storage device 200, as illustrated in FIG. 3A, the NVMe controller 204 may store the addresses of the HMB 102 as the HMB pointer list table 208a.

Further, at step 508, the solid state storage device 200 writes-back the HMB descriptor entries of the data buffer partition 102b of HMB 102 into the control buffer partition 102a of the HMB 102 of the host 100, wherein each of the HMB descriptor entries of the control buffer partition 102a is referred to by the HMB pointer list table 208a in the solid state storage device 200.

Further, at step 510, when data transfer to the data buffer partition 102b of the HMB 102 is desired by the solid state storage device 200, the solid state storage device 200 determines the HMB list pointer table 208a entry that corresponds to the data buffer partition 102b under access, fetches the HMB descriptor entry from the HMB 102 (e.g., the control buffer partition 102a), and calculates the absolute address of the data buffer partition 102b of the HMB 102.

Further, at step 512, solid state storage device transfers the data between the device buffer 210 and the data buffer partition 102b of the HMB 102 by using the address calculated at step 510.

The various actions, acts, blocks, steps, or the like in the flowchart may be performed in the order presented, in a different order or simultaneously. Further, in some example embodiments, some of the actions, acts, blocks, steps, or the like may be omitted, added, modified, skipped, or the like without departing from the scope of the inventive concepts.

Figure 6:
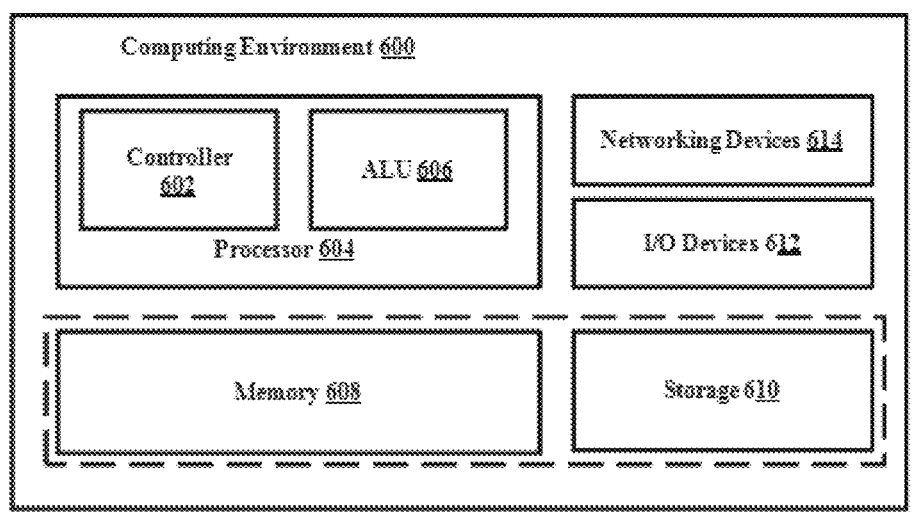
FIG. 6 illustrates a computing environment implementing the operation of FIG. 5, according to an example embodiment as disclosed herein.

FIG. 6 illustrates a computing environment implementing the operations of FIG. 5 (e.g., operations for managing the HMB 102 of the host 100 by the solid storage apparatus 200), according to an example embodiment as disclosed herein. As depicted in FIG. 6, the computing environment 600 may include at least one processor 604, which includes, for example, a controller 602 and an Arithmetic Logic Unit (ALU) 606, a memory 608, a storage 610, a plurality of networking devices 614 and a plurality Input output (I/O) devices 612. The processor 604 may process instructions for the proposed methods. The processor 604 may receive commands from the controller 602 in order to perform its processing. Further, any logical and arithmetic operations involved in the execution of the instructions may be computed by the ALU 606.

The overall computing environment 600 can be composed of multiple homogeneous and/or heterogeneous cores, multiple CPUs of different kinds, special media and other accelerators. The processor 604 may process instructions for the proposed methods. Further, the plurality of processors 604 may be located on a single chip or over multiple chips.

Instructions and/or codes to implement the proposed methods and/or systems may be stored in either the memory 608 or the storage 610, or both. At the time of execution, the instructions may be fetched from the corresponding memory 608 or storage 610, and may be executed by the processor 604.

In case of any hardware implementations, various networking devices 614 and/or external I/O devices 612 may be connected to the computing environment 600 to support the implementation through the networking devices 614 and the I/O devices 612.

The example embodiments disclosed herein can be implemented through at least one software program running on at least one hardware device and performing network management functions to control the elements. The elements shown in FIGS. 3 through 6 include blocks which are implemented by a hardware device, or a combination of hardware device and software module.

The foregoing description of the some example embodiments are provided to fully convey the nature of example embodiments so that others can, by applying current knowledge, readily modify or adapt the disclosed example embodiment for various applications without departing from the generic concepts. Therefore, such adaptations and modifications should and are intended to be made within the meaning and range of equivalents of the disclosed example embodiments. It is to be understood that the phraseologies or terminologies employed herein are for the purposes of description and not of limitation. Therefore, while example embodiments have been described with reference to some example embodiments, those skilled in the art will recognize that the disclosed example embodiments herein can be practiced with modification within the spirit and scope of example embodiments.

What is claimed is:

1. A solid state storage device comprising a non-volatile memory Express (NVMe) controller and configured to manage a Host Memory Buffer (HMB) in a host, the NVMe controller configured to:
    fetch HMB descriptor entries as part of a feature command from the host;
    partition the HMB logically into a control buffer partition and a data buffer partition;
    store the HMB descriptor entries pointing to the control buffer partition within the solid state storage device as an HMB pointer list table; and
    write-back the HMB descriptor entries pointing to the data buffer partition into the control buffer partition of HMB.

2. The solid state storage device of claim 1, wherein the NVMe controller is configured to store the HMB descriptor entries pointing to control buffer partition by,
    splitting the HMB descriptor entries by page and choose the HMB descriptor entries corresponding to the control buffer partition of the HMB, and
    storing addresses of the HMB descriptor entries corresponding to control buffer partition of the HMB as the HMB pointer list table in the solid state storage device.

3. The solid state storage device of claim 1, wherein the NVMe controller is configured to store the HMB descriptor entries pointing to control buffer partition by,
    splitting the HMB descriptor entries by page and choose the HMB descriptor entries corresponding to the data buffer partition of the HMB, and
    storing addresses of the HMB descriptor entries corresponding to the data buffer partition in the control buffer partition of the HMB.

4. The solid state storage device of claim 3, wherein the NVMe controller is further configured to manage an access to the data buffer partition of the HMB by,
    identifying the HMB pointer list table for a data transfer,
    fetching at least one of the HMB descriptor entries in the HMB pointer list table from the control buffer partition,
    identify at least one address of the data buffer partition of the HMB to which the data transfer is desired, and
    transferring data between the host and the solid state storage device.

5. The solid state storage device of claim 4, wherein the solid state storage device is further configured to store the data in the data buffer partition of the HMB in the host.

6. A system comprising:
    a host including,
        a Host Memory Buffer (HMB), and
        a host driver configured to provide HMB descriptor entries as part of a feature command to a solid state storage device; and
    the solid state storage device including a non-volatile memory express (NVMe) controller, the NVMe controller configured to,
        fetch the HMB descriptor entries as the part of the feature command from the host,
        partition the HMB in the host as a control buffer partition and a data buffer partition,
        store the HMB descriptor entries pointing to the control buffer partition, within the solid state storage device as an HMB pointer list table,
        write-back the HMB descriptor entries pointing to the data buffer partition of HMB into the control buffer partition of HMB, and
        transfer data between the data buffer partition of the HMB and the solid state storage device.

7. The system of claim 6, wherein the NVMe controller is configured to transfer the data between the data buffer partition of HMB and the solid state storage device by,
    identifying the HMB pointer list table for a data transfer,
    fetching at least one of the HMB descriptor entries in the HMB pointer list table from control buffer partition,
    identify at least one address of the data buffer partition of the HMB to which the data transfer is desired, and
    transferring the data between the data partition of HMB and the solid state storage device.

8. A solid state storage device including a non-volatile memory Express (NVMe) controller and configured to manage a Host Memory Buffer (HMB) in a host, the NVMe controller configured to:
    fetch HMB descriptor entries as part of a feature command from the host;
    partition the HMB logically into a control buffer partition and a data buffer partition;
    store a first set of HMB descriptor entries, among the HMB descriptor entries, into the solid state storage device as an HMB pointer list table, the first set of HMB descriptor entries pointing to the control buffer partition; and
    write-back a second set of HMB descriptor entries among the HMB descriptor entries into the control buffer partition of HMB, the second set of HMB descriptor entries pointing to the data buffer partition.

9. The solid state storage device of claim 8, wherein the NVMe controller is configured to store the first set of HMB descriptor entries by,
    splitting the HMB descriptor entries by page and choose the first set of HMB descriptor entries corresponding to the control buffer partition of the HMB, and
    storing addresses of the first set of HMB descriptor corresponding to control buffer partition of the HMB as the HMB pointer list table.

10. The solid state storage device of claim 8, wherein the NVMe controller is configured to store the first set of HMB descriptor entries by,
    splitting the HMB descriptor entries by page and choose the second set of HMB descriptor entries corresponding to the data buffer partition, and
    storing addresses of the second set of HMB descriptor entries corresponding to the data buffer partition in the control buffer partition.

11. The solid state storage device of claim 8, wherein the NVMe controller is further configured to manage an access to the data buffer partition of the HMB by, identifying the HMB pointer list table for a data transfer,
fetching at least one of the first set of HMB descriptor entries stored in the HMB pointer list table from the control buffer partition,
identify at least one address of the data buffer partition of the HMB to which the data transfer is desired, and
transferring data between the host and the solid state storage device.

12. The solid state storage device of claim 8, wherein the NVMe controller is further configured to store data in the data buffer partition of the HMB in the host.

* * * * *